(12) United States Patent
Kuroda et al.

(10) Patent No.: US 9,829,961 B2
(45) Date of Patent: Nov. 28, 2017

(54) ELECTRONIC DEVICE

(71) Applicant: Sharp Kabushiki Kaisha, Osaka-shi, Osaka (JP)

(72) Inventors: Hisashi Kuroda, Osaka (JP); Hiroki Tanabe, Osaka (JP); Junichi Sasaki, Higashi-hiroshima (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 14/778,661

(22) PCT Filed: Feb. 18, 2014

(86) PCT No.: PCT/JP2014/053729
§ 371 (c)(1),
(2) Date: Sep. 21, 2015

(87) PCT Pub. No.: WO2014/148174
PCT Pub. Date: Sep. 25, 2014

(65) Prior Publication Data
US 2016/0048199 A1    Feb. 18, 2016

(30) Foreign Application Priority Data

Mar. 22, 2013 (JP) ................. 2013-060192

(51) Int. Cl.
*G06F 1/32* (2006.01)
*G06F 9/50* (2006.01)
*G06F 12/06* (2006.01)

(52) U.S. Cl.
CPC .......... *G06F 1/3287* (2013.01); *G06F 1/3206* (2013.01); *G06F 1/3275* (2013.01);
(Continued)

(58) Field of Classification Search
CPC .... G06F 1/3287; G06F 1/3206; G06F 1/3275; G06F 9/5094
See application file for complete search history.

(56) References Cited

U.S. PATENT DOCUMENTS 6,327,664 B1 * 12/2001 Dell ................ G06F 1/3203
713/320
6,948,029 B2 * 9/2005 Yano ................ G11C 11/406
711/105

(Continued)

FOREIGN PATENT DOCUMENTS

CN    102595016 A    7/2012
CN    102934046 A    2/2013
(Continued)

OTHER PUBLICATIONS

Official Communication issued in International Patent Application No. PCT/JP2014/053729, mailed on May 13, 2014.

*Primary Examiner* — Stefan Stoynov
(74) *Attorney, Agent, or Firm* — Keating & Bennett, LLP

(57) ABSTRACT

An electronic device whose power consumption can be reduced appropriately depending on the condition of use by a user is provided. The electronic device having a power saving mode includes a processor and a plurality of memories configured to be able to become a stopped state individually, and available to the processor. The processor causes a predetermined number of memories among the plurality of memories to become the stopped state, based on a processing load of the processor, to thereby make a shift to the power saving mode. In the power saving mode, the processor has a standby state of restricting the operation of a part of the electronic device and an active state of normally controlling the operation of the electronic device, and maintains the stopped state of the predetermined number of
(Continued)

memories regardless of whether the processor is in the standby state or the active state.

3 Claims, 13 Drawing Sheets

(52) U.S. Cl.
CPC .......... *G06F 9/5094* (2013.01); *G06F 1/3237* (2013.01); *G06F 12/06* (2013.01); *Y02B 60/1228* (2013.01); *Y02B 60/142* (2013.01); *Y02B 60/32* (2013.01)

(56) References Cited

U.S. PATENT DOCUMENTS

| | | | |
|---|---|---|---|
| 7,770,040 B2* | 8/2010 | Aleksic | ................. G06F 1/3203 345/545 |
| 8,683,249 B2* | 3/2014 | Kanai | ................... G06F 1/3275 713/323 |
| 2009/0222620 A1 | 9/2009 | Kanai | |
| 2011/0283124 A1 | 11/2011 | Branover et al. | |
| 2012/0173896 A1 | 7/2012 | Tanaka | |

FOREIGN PATENT DOCUMENTS

| | | |
|---|---|---|
| JP | 2004-038642 A | 2/2004 |
| JP | 2006-221381 A | 8/2006 |
| JP | 2009-211153 A | 9/2009 |
| JP | 2011-018138 A | 1/2011 |
| JP | 2012-088906 A | 5/2012 |

* cited by examiner

FIG.3
(a)
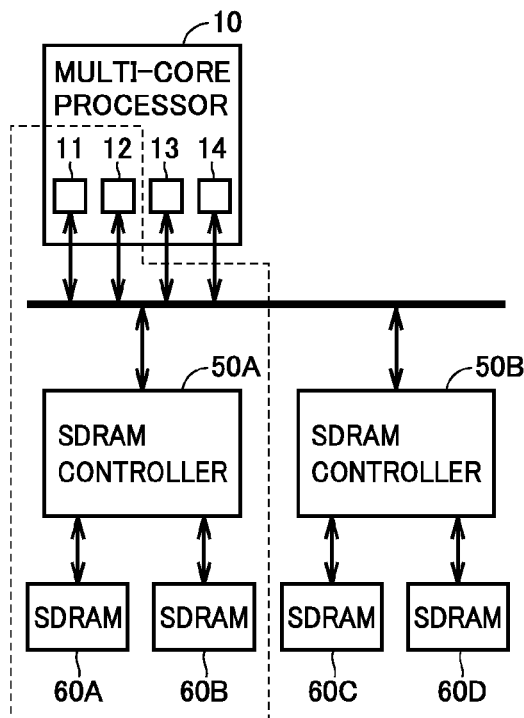
(b)
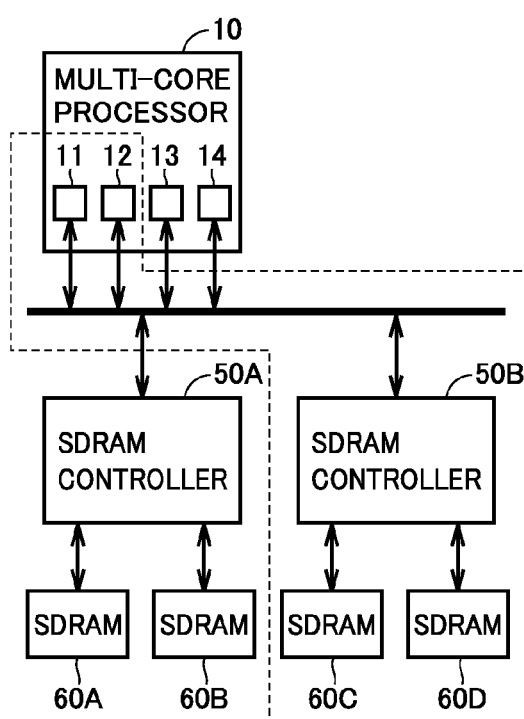

ized with a large-capacity SDRAM (Synchronous Dynamic Random Access Memory) in order to execute a plurality of applications at high speed. The power consumption of the SDRAM is larger relative to other devices included in the mobile terminal device. Thus, as a technique aiming at power saving of the SDRAM (power saving of the mobile terminal device), a technique utilizing a deep power down (DPD) mode of the SDRAM is known.

ELECTRONIC DEVICE

TECHNICAL FIELD

The present invention relates to an electronic device having a power saving mode.

BACKGROUND ART

Portable mobile terminal devices such as mobile phone, mobile game console, and mobile music player have become widespread. These mobile terminal devices have become increasingly enhanced in performance, and are each equipped with a large-capacity SDRAM (Synchronous Dynamic Random Access Memory) in order to execute a plurality of applications at high speed. The power consumption of the SDRAM is larger relative to other devices included in the mobile terminal device. Thus, as a technique aiming at power saving of the SDRAM (power saving of the mobile terminal device), a technique utilizing a deep power down (DPD) mode of the SDRAM is known.

For example, Japanese Patent Laying-Open No. 2012-88906 (PTD 1) discloses an electronic device having a power saving mode in which a memory is stopped. The electronic device includes: first and second memories that can individually be caused to become a stopped state; a memory control unit replacing a control signal for the first memory and a control signal for the second memory with each other; and a central control unit shifting the second memory to the stopped state when making a shift to the power saving mode, and shifting the first memory to the stopped state after the second memory becomes a stopped state in which the second memory can return to a normal state, and also causing the memory control unit to replace the control signal for the first memory and the control signal for the second memory with each other.

CITATION LIST

Patent Document

PTD 1: Japanese Patent Laying-Open No. 2012-88906

SUMMARY OF INVENTION

Technical Problem

In the case where a user uses an application included in the mobile terminal device, there are some conditions in which the user uses an application such as game for which the processing load of a processor of the mobile terminal device is large, and some otherwise conditions. In the condition where the user uses an application for which the processing load of the processor is small, deterioration of the performance felt by the user is small even when the throughput of the processor and the memory capacity are relatively small. Therefore, in this condition, it is desirable to reduce as much as possible the electric power consumed by the processor and the memory.

The present invention has been made to solve the problem as described above, and an object of the invention is to provide an electronic device whose power consumption can be reduced appropriately depending on the condition of use by a user.

Solution to Problem

According to an embodiment, an electronic device having a power saving mode is provided. The electronic device includes a processor controlling an operation of the electronic device, and a plurality of memories configured to be able to become a stopped state individually, and available to the processor. The processor causes a predetermined number of memories among the plurality of memories to become the stopped state, based on a processing load of the processor, to thereby make a shift to the power saving mode. In the power saving mode, the processor has a standby state of restricting the operation of a part of the electronic device and an active state of normally controlling the operation of the electronic device, and maintains the stopped state of the predetermined number of memories regardless of whether the processor is in the standby state or the active state.

Advantageous Effects of Invention

Power consumption can be reduced appropriately depending on the condition of use by a user.

BRIEF DESCRIPTION OF DRAWINGS

FIG. 3 is a conceptual diagram for illustrating other examples of Operating State A of the electronic device according to the first embodiment.

DESCRIPTION OF EMBODIMENTS

Figure 1:
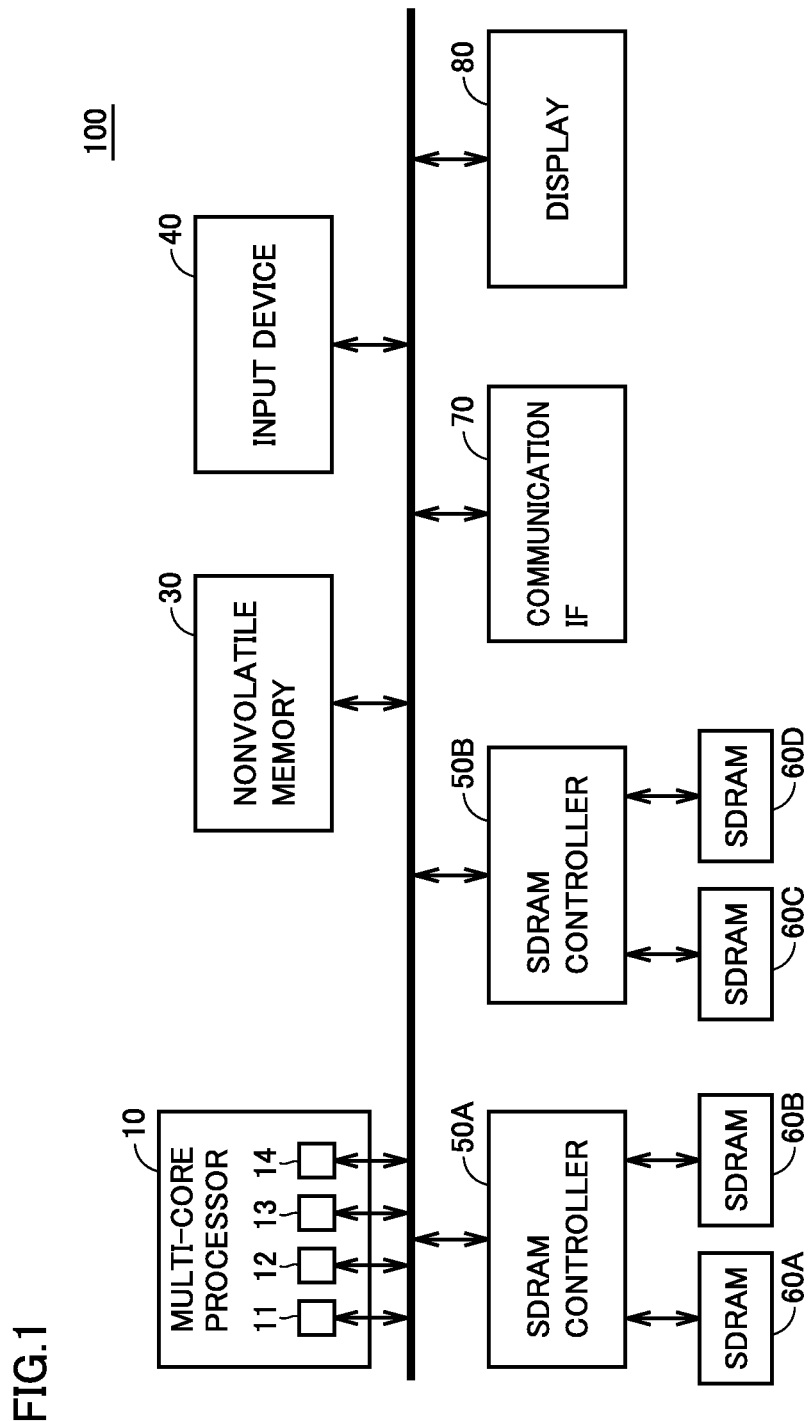
FIG. 1 is a schematic diagram showing a hardware configuration of an electronic device according to a first embodiment.

Embodiments of the present invention will hereinafter be described with reference to the drawings. In the following description, the same parts are denoted by the same reference characters. They are named identically and function identically as well. A detailed description of them will therefore not be repeated.

[First Embodiment]

<Hardware Configuration>

FIG. 1 is a schematic diagram showing a hardware configuration of an electronic device 100 according to a first embodiment. In the following, a case where electronic device 100 is a smart phone will be described. It should be noted that electronic device 100 can be implemented as any device regardless of the type of the device. For example, electronic device 100 can also be implemented as a tablet terminal device, a PDA (Personal Digital Assistance), a notebook PC (Personal Computer), or the like.

Referring to FIG. 1, electronic device 100 includes, as its main components, a multi-core processor (hereinafter also referred to simply as "multi-core") 10, a nonvolatile memory 30, an input device 40, controllers 50A, 50B (hereinafter also referred to collectively as "controller 50"), SDRAM 60A, 60B, 60C, 60D (hereinafter also referred to collectively as "SDRAM 60"), a communication interface (I/F) 70, and a display 80.

Multi-core 10 has a plurality of cores (CPU (Central Processing Unit)) 11 to 14. Multi-core 10 uses at least one or more of cores 11 to 14 to control the operation of each part of electronic device 100. Multi-core 10 is a multi-core processor equipped with four cores operating at high-speed frequencies (having high information processing ability) but consuming large power. In the following, it is supposed for the sake of ease of description that at least core 11 is an active core. It should be noted that an active core is a core which is executing or available for executing an instruction at least at a specific point of time.

Multi-core 10 reads and executes a program stored in nonvolatile memory 30 and data stored in SDRAM 60 to thereby control the operation of each part of electronic device 100. Multi-core 10 executes the program to thereby implement each of the processes (steps) of electronic device 100 as described later herein. Further, in order to control the CPU operating frequency and the number of active cores, multi-core 10 monitors the operating frequency and the utilization ratio of cores 11, 12, 13, 14 at regular intervals to manage the operating frequency and the number of active cores of multi-core 10 as a whole.

Nonvolatile memory 30 is implemented by a flash memory, a hard disk, or the like. Nonvolatile memory 30 stores a program to be executed by multi-core 10, or data to be utilized by multi-core 10, or the like.

Input device 40 receives operation inputs to electronic device 100. Input device 40 is implemented for example by a keyboard, buttons, a mouse, or the like. Input device 40 may also be implemented as a touch panel.

Controller 50 controls each SDRAM 60. Typically, controller 50 controls reading of data stored in SDRAM 60, writing of data, a refresh operation, or the like.

SDRAM 60A to 60D are each a volatile memory utilized by multi-core 10 when it executes an application. SDRAM 60 is for example a DDR (Double-Data-Rate) mobile RAM. SDRAM 60 is configured to be able to individually shift to the DPD state based on an instruction from multi-core 10. Although SDRAM 60 having shifted to the DPD mode does not perform the refresh operation and therefore cannot hold the stored data, its power consumption can significantly be reduced.

Communication interface (I/F) 70 is a communication interface for communicating a variety of data between electronic device 100 and an external device. The communication system may for example be wireless communication based on Bluetooth®, wireless LAN (Local Area Network), or the like, or wired communication by means of a USB (Universal Serial Bus) or the like. Electronic device 100 may be connected to a mobile communication network through communication interface 70 and transmit/receive signals for wireless communication. Accordingly, electronic device 100 can communicate with a communication device through a mobile communication network of the third generation of mobile telecommunications system (3G), LTE (Long Term Evolution), or the like.

Display 80 displays on its display screen images, text, and other information, based on signals from multi-core 10. Electronic device 100 may have a peripheral circuit such as microphone, speaker, camera, memory interface, or the like.

<Operating State>

Figure 2:
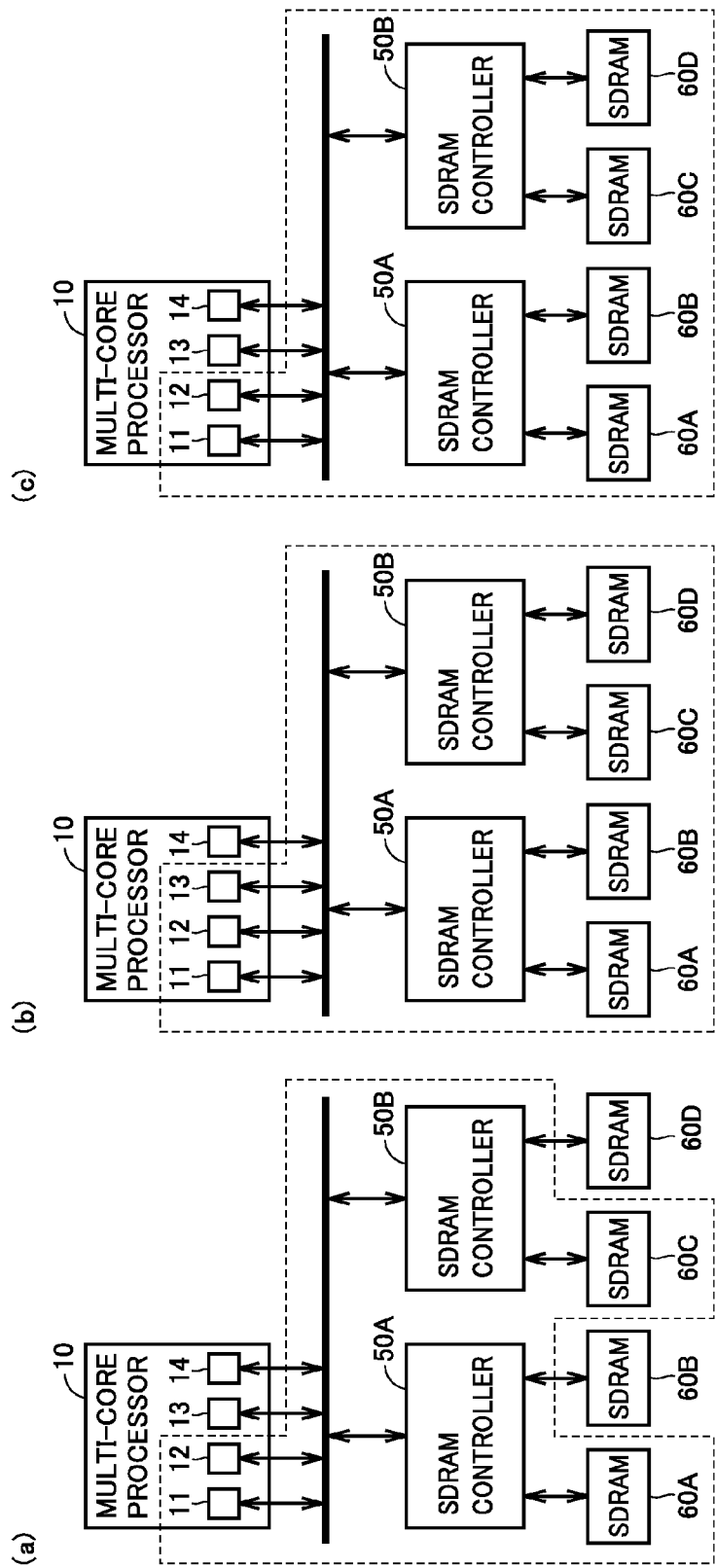
FIG. 2 is a conceptual diagram for illustrating a plurality of operating states of the electronic device according to the first embodiment.

FIG. 2 is a conceptual diagram for illustrating a plurality of operating states of electronic device 100 according to the first embodiment. It should be noted that FIG. 2 shows only multi-core 10, controller 50, and SDRAM 60, for the sake of ease of description. Further, it is supposed that each SDRAM 60 has a capacity of 1 GB.

The operating state of electronic device 100 shown in FIG. 2 (a) is a state where multi-core 10 in which cores 11, 12 are active cores utilizes SDRAM 60A through controller 50A, utilizes SDRAM 60C through controller 50B, and also controls the operation of electronic device 100 (hereinafter also referred to "Operating State A"). In Operating State A, SDRAM 60B, 60D have been shifted to the DPD mode state (stopped state). Multi-core 10 is therefore in the state where it can utilize a memory capacity of 2 GB.

The operating state of electronic device 100 shown in FIG. 2 (b) is a state where multi-core 10 in which cores 11 to 13 are active cores utilizes SDRAM 60A, 60B through controller 50A, utilizes SDRAM 60C, 60D through controller 50B, and also controls the operation of electronic device 100 (hereinafter also referred to as "Operating State B"). In Operating State B, no SDRAM 60 has been shifted to the DPD mode state (hereinafter also referred to as "DPD state"). Thus, multi-core 10 can utilize all SDRAM 60 (a memory capacity of 4 GB).

The operating state of electronic device 100 shown in FIG. 2 (c) is a state where multi-core 10 in which cores 11, 12 are active cores utilizes SDRAM 60A, 60B through controller 50A, utilizes SDRAM 60C, 60D through controller 50B, and also controls the overall operation of electronic device 100 (hereinafter also referred to as "Operating State C"). In Operating State C, like Operating State B, no SDRAM 60 has been shifted to the DPD state. Thus, multi-core 10 can utilize all SDRAM 60 (a memory capacity of 4 GB).

Based on the foregoing, the operating state of electronic device 100 with the smallest power consumption, among Operating States A to C, is Operating State A in which the number of active cores is smallest and SDRAM 60 corresponding to 2 GB can be utilized (the remaining 2 GB is in the DPD state). Namely, Operating State A is a power saving mode state of electronic device 100. In contrast, the operating state of electronic device 100 with the largest power consumption is Operating State B in which multi-core 10 can utilize SDRAM 60 corresponding to 4 GB (no SDRAM 60 is in the DPD state). It should be noted that the power consumption of electronic device 100 in Operating State C is smaller than the power consumption thereof in Operating State B and larger than the power consumption thereof in Operating State A.

Electronic device 100 is configured to change between the aforementioned multiple operating states, depending on the processing load or the like of multi-core 10, as detailed later herein. For example, in the case where an application for which the processing load of the processor is large is used, a high information processing ability is necessary, and therefore, the operating state is Operating State B in which the core utilization ratio and the core operating frequency are high and the available memory capacity is large (4 GB). In contrast, in the case where an application for which the processing load of the processor is small is used, the operating state is Operating State A in which the core utilization ratio and the core operating frequency are low and the available memory capacity is small (2 GB). Operating State C is an operating state performing an intermediary function for a shift from Operating State B to Operating State A based on a predetermined condition.

It should be noted that Operating State A may be any state as long as it is a state where multi-core 10 can utilize SDRAM 60 corresponding to 2 GB, and is not limited to the example as shown in FIG. 2 (*a*). For example, Operating State A may be the following form as shown in FIG. 3.

FIG. 3 is a conceptual diagram for illustrating other examples of Operating State A of electronic device 100 according to the first embodiment. Referring to FIG. 3, Operating State A may be a state where multi-core 10 utilizes SDRAM 60A, 60B through controller 50A and controls the overall operation of electronic device 100 (FIG. 3 (*a*)), or a state where multi-core 10 utilizes SDRAM 60C, 60D through controller 50B and controls the overall operation of electronic device 100 (FIG. 3 (*b*)).

<Power Consumption Reducing Effect>

Figure 4:
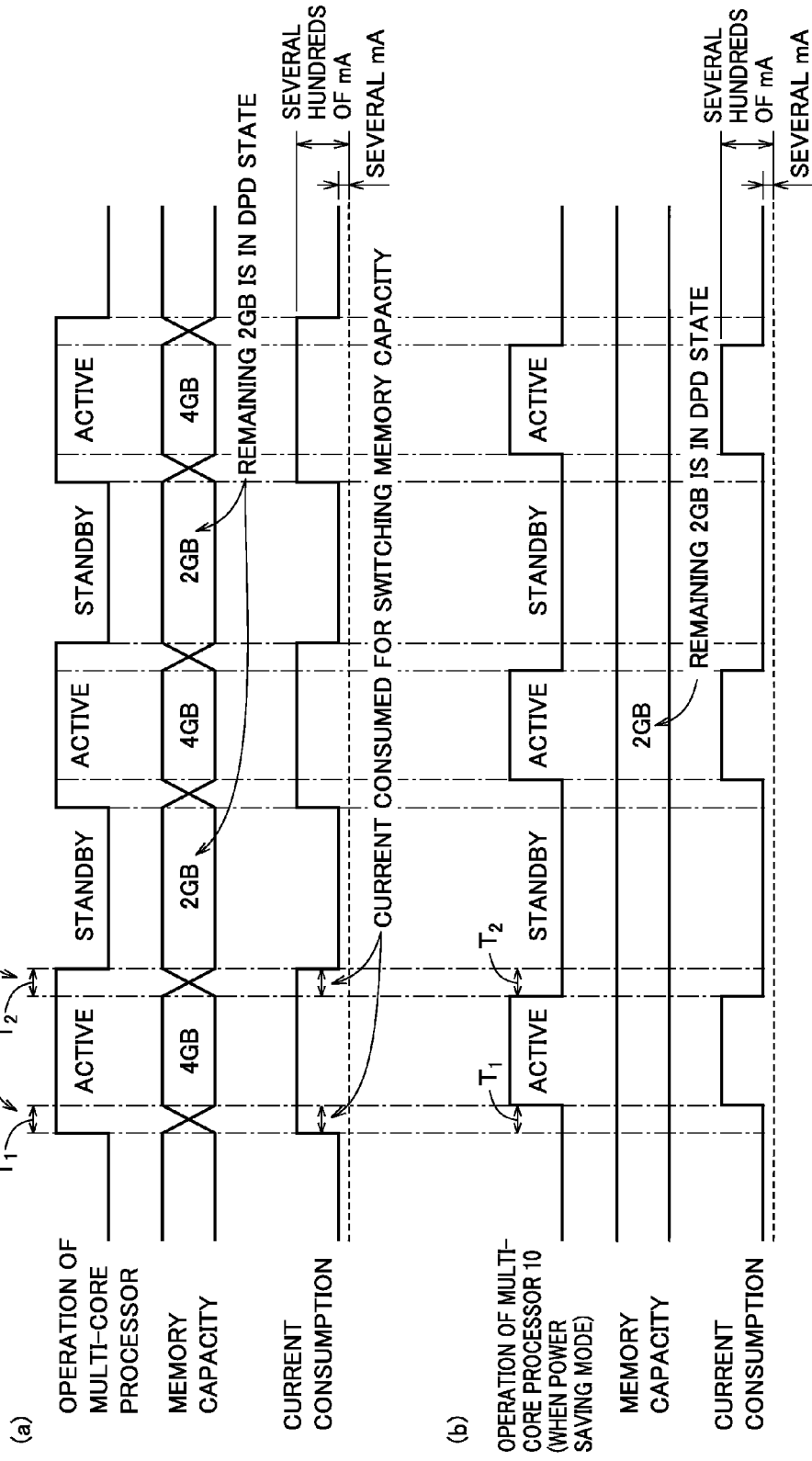
FIG. 4 is a timing diagram for illustrating a power consumption reducing effect in Operating State A (power saving mode) of the electronic device according to the first embodiment.

FIG. 4 is a timing diagram for illustrating a power consumption reducing effect in Operating State A (power saving mode) of electronic device 100 according to the first embodiment. Specifically, FIG. 4 (*a*) is a diagram showing changes with time of the operation of a multi-core, the memory capacity, and the power consumption of an electronic device according to a comparative example. FIG. 4 (*b*) is a diagram showing changes with time of the operation of multi-core 10, the memory capacity, and the power consumption of electronic device 100 according to the first embodiment. It should be noted that the performance of the multi-core of the comparative example and the performance of multi-core 10 are similar to each other.

Here, the multi-core of the comparative example and multi-core 10 have a standby state of restricting the operation of a part of the electronic device, and an active state of normally controlling the operation of the electronic device. In the standby state, it is unnecessary for these multi-cores to control all of the functions constituting the electronic device. For example, in the standby state, electronic device 100 turns off the power for unnecessary blocks in an SOC (System on Chip) which includes multi-core 10 and performs clock gating. Accordingly, the current consumption (several mA) of electronic device 100 in the standby state is significantly smaller than the current consumption (several hundreds of mA) thereof in the active state.

With reference to FIG. 4 (*a*), it is seen that the multi-core of the comparative example changes the memory capacity each time a switch is made between the standby state and the active state. Namely, the multi-core of the comparative example utilizes the memory corresponding to 4 GB when it is in the active state, and utilizes the memory corresponding to 2 GB and has shifted the memory corresponding to the remaining 2 GB to the DPD state when it is in the standby state.

In contrast, with reference to FIG. 4 (*b*), multi-core 10 of the first embodiment utilizes the memory corresponding to 2 GB and keeps the memory corresponding to the remaining 2 GB in the DPD state, when it is in the power saving mode (Operating State A), regardless of whether it is in the standby state or the active state. Therefore, relative to multi-core 10, the multi-core of the comparative example takes a processing time longer by time T1 which is required for switching the memory capacity when it changes from the standby state to the active state. Likewise, relative to multi-core 10, the multi-core of the comparative example takes a processing time longer by T2 which is required for switching the memory capacity when it changes from the active state to the standby state. Accordingly, multi-core 10 can reduce the current consumption by an amount corresponding to a processing time of T1+T2, relative to the multi-core of the comparative example.

Here, an electronic device such as smart phone communicates with a base station or the like every a few seconds. Therefore, even when a user performs no operation for a prescribed time to thereby cause the multi-core to become the standby state, the multi-core is immediately returned to the active state by the communication with the base station or the like. Namely, the multi-core is frequently and repeatedly changed between the standby state and the active state. Thus, relative to the electronic device equipped with the multi-core of the comparative example which switches the memory capacity each time a switch is made between the standby state and the active state, electronic device 100 equipped with multi-core 10 which does not switch the memory capacity regardless of whether it is in the standby state or the active state can reduce the power consumption as a whole.

It should be noted that although the memory capacity is also switched when multi-core 10 makes a transition between Operating State B and Operating State A, multi-core 10 will not suddenly make a transition from the standby state to Operating State B of high performance unless the user causes such a transition as intended. At least the communication with a base station or the like does not cause the transition from the standby state to Operating State B. Thus, the power consumption of electronic device 100 can be reduced relative to the electronic device equipped with the multi-core of the comparative example.

Further, when electronic device 100 of the first embodiment is in Operating State A, the available memory capacity is 2 GB (the remaining 2 GB is in the DPD state) even when multi-core 10 is in the active state. Operating State A, however, is essentially intended to serve as an operating state under the condition that a high throughput of the processor is unnecessary, and therefore, a disadvantage (deterioration of the performance felt by the user) caused by the fact that a memory capacity of 2 GB is maintained regardless of whether it is the active state or the standby state is insignificant, and an advantage that the power consumption can be reduced is rather significant.

<Transitions of the Operating State>

Figure 5:
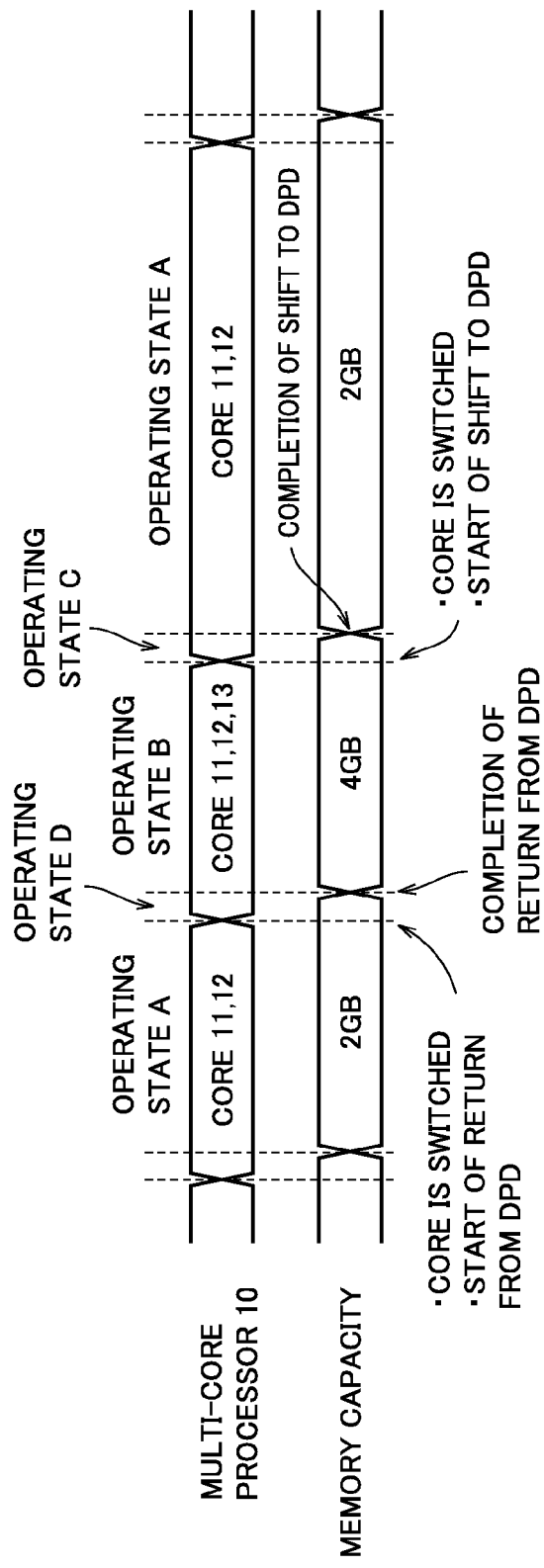
FIG. 5 is a timing diagram for illustrating transitions of the operating state of the electronic device according to the first embodiment.

FIG. 5 is a timing diagram for illustrating transitions of the operating state of electronic device 100 according to the first embodiment. Referring to FIG. 5, a description will be given of a situation where electronic device 100 makes a transition from Operating State A to Operating State B. Electronic device 100 in Operating State A starts making a transition to Operating State B of high performance when the processing load of multi-core 10 becomes a predetermined threshold value A or more (for example, the utilization ratio of core 11 becomes 70% or more and the operating frequency thereof becomes 900 MHz or more). Specifically, multi-core 10 makes core 13 active to increase the number of active cores to three and thereby increase the throughput (it may increase the number of active cores to four). Then, multi-core 10 causes SDRAM 60 corresponding to 2 GB having been shifted to the DPD state to return to the normal state. Electronic device 100 thus makes a transition to Operating State B in which multi-core 10 utilizes SDRAM 60 corresponding to 4 GB. It should be noted that during the transition from Operating State A to Operating State B, Operating State D is temporarily generated in which multi-core 10 utilizes SDRAM 60 corresponding to 2 GB and performs operation control of electronic device 100.

Next, a description will be given of a situation where electronic device 100 makes a transition from Operating State B to Operating State A. Electronic device 100 in Operating State B starts making a transition to Operating State A of low performance when the processing load of multi-core 10 becomes less than a predetermined threshold value B (for example, the utilization ratio of core 11 become less than 70%, the operating frequency thereof becomes less than 900 MHz). Specifically, multi-core 10 makes core 13 inactive to decrease the number of active cores to two (it may decrease the number of active cores to one (core 11 only)). At this time, electronic device 100 makes a transition from Operating State B to Operating State C.

Then, when multi-core 10 satisfies a predetermined condition, multi-core 10 causes SDRAM 60 corresponding to 2 GB, out of the available SDRAM 60 corresponding to 4 GB, to shift to the DPD state. Specifically, when multi-core 10 determines that its processing load is less than a predetermined threshold value C (for example, the utilization ratio of active cores 11, 12 is less than 70% and the operating frequency thereof is less than 900 MHz), multi-core 10 causes SDRAM 60 corresponding to 2 GB to shift to the DPD state based on the state of controller 50. Specifically, when multi-core 10 determines that its processing load is less than threshold value C and determines that controller 50 is in an idle state of not accessing SDRAM 60 based on a status register of controller 50, multi-core 10 causes SDRAM 60 corresponding to 2 GB to shift to the DPD state. In this way, electronic device 100 makes a transition from Operating State C to Operating State A in which multi-core 10 utilizes SDRAM 60 corresponding to 2 GB and performs operation control of electronic device 100.

Next, a description will be given of another example of the transitions of the operating state of electronic device 100 according to the first embodiment.

Figure 6:
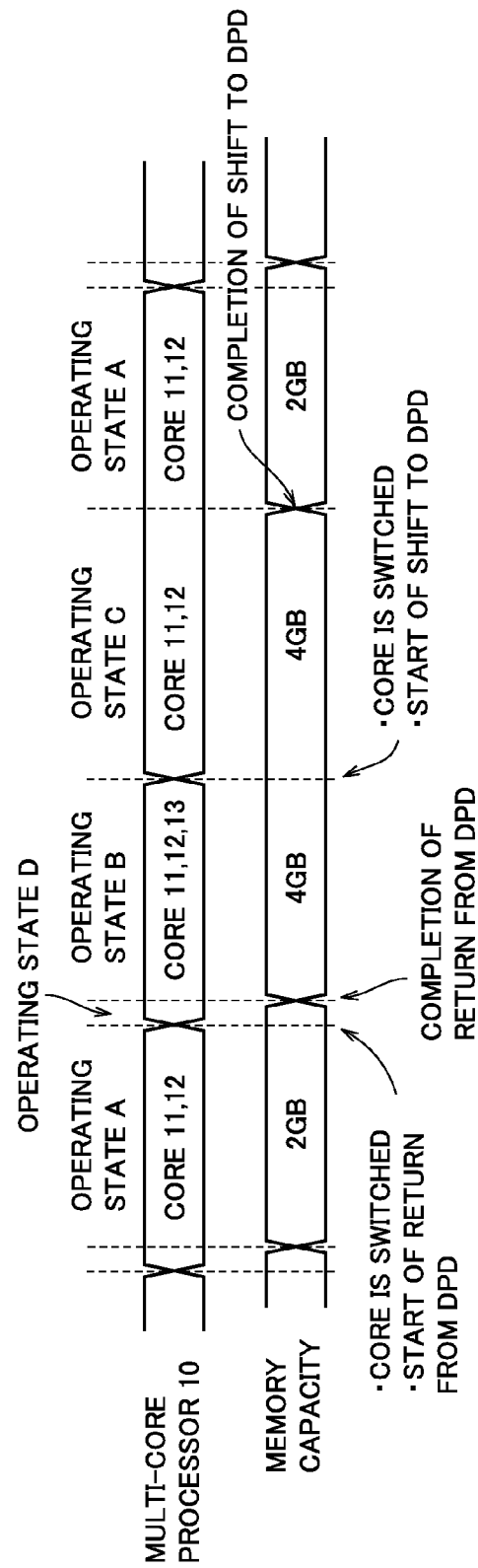
FIG. 6 is another timing diagram for illustrating transitions of the operating state of the electronic device according to the first embodiment.

FIG. 6 is another timing diagram for illustrating transitions of the operating state of electronic device 100 according to the first embodiment. Referring to FIG. 6, the situation where electronic device 100 makes a transition from Operating State A to Operating State B and the situation where it makes a transition from Operating State B to Operating State C are similar to those of the example in FIG. 5, and therefore, the detailed description thereof will not be repeated.

As shown in FIG. 6, it is seen that in the situation where a transition is made from Operating State C to Operating State A, the period of Operating State C is longer than that in the timing diagram of FIG. 5. Namely, the time from the start of the process of shifting SDRAM 60 corresponding to 2 GB to the DPD state to the completion of this process is longer. This is for the reason that multi-core 10 confirms the processing loads of all bus masters including multi-core 10 itself and, when the processing loads of them are less than a predetermined threshold value, multi-core 10 then causes SDRAM 60 corresponding to 2 GB to the DPD state.

Specifically, when multi-core 10 determines that the processing loads of all bus masters including multi-core 10 itself are less than a predetermined threshold value which is optimized for each bus master, multi-core 10 causes SDRAM 60 corresponding to 2 GB to shift to the DPD state based on the state of controller 50. More specifically, multi-core 10 determines whether or not the conditions: (1) the processing load of multi-core 10 is less than threshold value C; and (2) the processing load of each of other bus masters is less than threshold value Cx which is set for each bus master, are met. In the case where multi-core 10 determines that the conditions (1) and (2) are met and determines that controller 50 is in the idle state based on the status register of controller 50, multi-core 10 causes SDRAM 60 corresponding to 2 GB to shift to the DPD state. In this way, electronic device 100 makes a transition from Operating State C to Operating State A. The bus master is for example communication interface 70 such as modem mounted on electronic device 100. The bus master may alternatively be a GPU (Graphics Processing Unit).

<Process Procedure>

Figure 7:
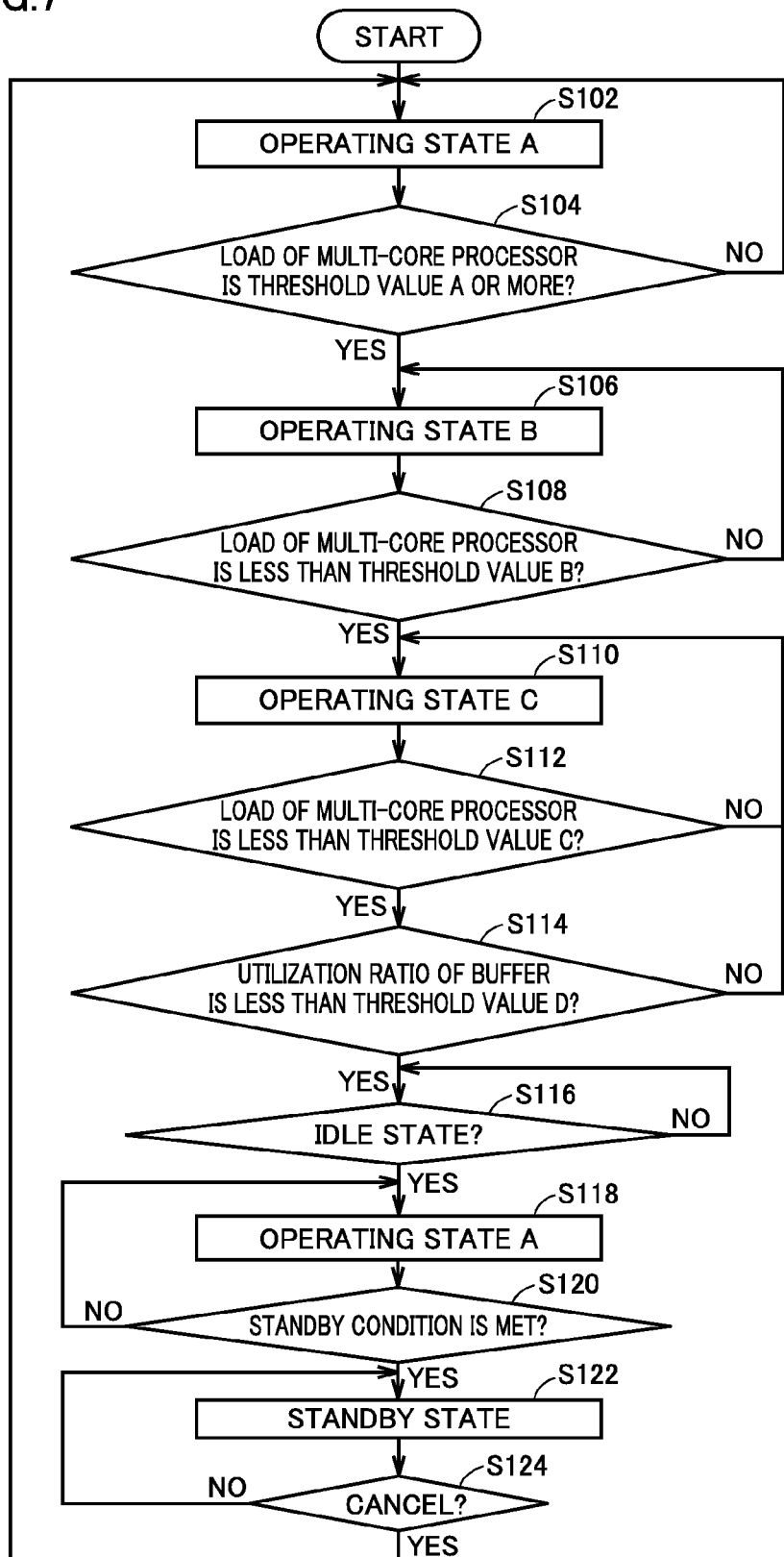
FIG. 7 is a flowchart showing a control process for the capacity of an SDRAM of the electronic device according to the first embodiment.

FIG. 7 is a flowchart showing a control process for the capacity of the SDRAM of electronic device 100 according to the first embodiment. Each of the following steps is basically implemented through execution, by multi-core 10, of a program stored in nonvolatile memory 30.

Referring to FIG. 7, electronic device 100 determines, while being kept in Operating State A (step S102), whether or not the processing load of multi-core 10 is predetermined threshold value A or more (step S104). Specifically, multi-core 10 makes this determination based on at least any of the utilization ratio of the core, the operating frequency of the core, and the number of active cores. For example, in the case where the utilization ratio of core 11 is 70% or more, the operating frequency of core 11 is 900 MHz, and the number of active cores is two or more (cores 11, 12 are active, for example), multi-core 10 determines that the processing load is threshold value A or more.

When the processing load of multi-core 10 is not threshold value A or more (NO in step S104), electronic device 100 repeats the process from step S102. Namely, electronic device 100 is kept in Operating State A. In contrast, when the processing load is threshold value A or more (YES in step S104), electronic device 100 makes a transition from Operating State A to Operating State B (step S106). Specifically, multi-core 10 increases the number of active cores and causes SDRAM 60 corresponding to 2 GB in the DPD state to return to the normal state.

Next, electronic device 100 determines whether or not the processing load of multi-core 10 is less than predetermined threshold value B (step S108). Specifically, multi-core 10 makes this determination based on at least any of the utilization ratio of the core, the operating frequency of the core, and the number of active cores. For example, when the utilization ratio of core 11 is less than 70%, the operating frequency of core 11 is 900 MHz, and the number of active cores other than core 11 is one or less, multi-core 10 determines that the processing load is less than threshold value B.

In the case where the processing load of multi-core 10 is not less than threshold value B (NO in step S108), electronic device 100 repeats the process of step S106. Namely, electronic device 100 is kept in Operating State B. In contrast, when the processing load is less than threshold value B (YES in step S108), electronic device 100 makes a transition from Operating State B to Operating State C (step S110). Specifically, multi-core 10 makes core 13 inactive to decrease the number of active cores to two. Alternatively, multi-core 10 may decrease the number of active cores to one.

Next, electronic device 100 determines whether or not the processing load of multi-core 10 is less than predetermined threshold value C (step S112). Specifically, based on the utilization ratio of the active core and/or the operating frequency thereof, multi-core 10 makes this determination. For example, in the case where the utilization ratio of the active core is less than 70% and the operating frequency of the active core is less than 900 MHz, multi-core 10 determines that the processing load is less than threshold value C.

In the case where the processing load of multi-core 10 is not less than threshold value C (NO in step S112), electronic device 100 repeats the process of step S110. Namely, electronic device 100 is kept in Operating State C. In contrast, in the case where the processing load is less than threshold value C (YES in step S112), it determines whether or not the utilization ratio of a Read/Write buffer of controller 50 is less than a predetermined threshold value D (step S114). Specifically, multi-core 10 monitors controller 50 and determines whether or not the state where the utilization ratio of the buffer is less than 25% continues for a prescribed time or more.

In the case where the utilization ratio of the buffer is not less than threshold value D (NO in step S114), electronic device 100 repeats the process of step S110. Namely, electronic device 100 is kept in Operating State C. In contrast, when the utilization ratio of the buffer is less than threshold value D (YES in step S114), electronic device 100 proceeds to the process of step S 116. The above-described processes of steps S112, S114 are a process for multi-core 10 to find the timing at which a request for an access to SDRAM 60 does not frequently occur.

Next, electronic device 100 determines whether or not controller 50 is in the idle state (step S116). Specifically, multi-core 10 confirms the status register of controller 50 and determines whether or not controller 50 has no Read/Write access to SDRAM 60. The process of step S116 is a process for multi-core 10 to find the timing at which it issues to SDRAM 60 a command to cause this SDRAM 60 to shift to the DPD state (hereinafter also referred to as "DPD command").

In the case where controller 50 is not in the idle state (NO in step S116), electronic device 100 repeats the process of step S116. It should be noted that multi-core 10 monitors the operating frequency and the utilization ratio of cores 11, 12, 13, 14 at regular intervals and manages the operating frequency and the number of active cores of multi-core 10 as a whole. Specifically, even while the processes from step S110 to step S116 are performed, multi-core 10 monitors the operating frequency and the utilization ratio of cores 11, 12, 13, 14 all the time and controls the operating frequency of cores 11, 12, 13, 14 and the number of active cores. Therefore, in the case for example where the load of multi-core 10 becomes threshold value B or more in the period from step S110 to the time when the result of step S116 is "YES," electronic device 100 returns again to Operating State B (step S106).

In contrast, in the case where controller 50 is in the idle state (YES in step S116), electronic device 100 makes a transition from Operating State C to Operating State A (step S118). Specifically, multi-core 10 issues the DPD command to SDRAM 60 corresponding to 2 GB while controller 50 is in the idle state, to thereby cause this SDRAM 60 to shift to the DPD state.

Next, electronic device 100 determines whether or not a condition under which a shift to the standby state is made is met (step S120). Specifically, multi-core 10 determines whether or not an instruction is received through input device 40 from a user within a prescribed time. In the case where the instruction is not received within the prescribed time, multi-core 10 makes a transition to the standby state. In the case where multi-core 10 receives the instruction within the prescribed time, it does not make a transition to the standby state.

When this condition is not met (NO in step S120), electronic device 100 repeats the process of step S120. In contrast, when this condition is met (YES in step S120), electronic device 100 (multi-core 10) makes a transition to the standby state (step S122).

Next, electronic device 100 determines whether to cancel the standby state or not (step S124). Specifically, multi-core 10 determines whether or not an interrupt for cancelling the standby state is detected. In the case where multi-core 10 detects the interrupt, it cancels the standby state. In the case where multi-core 10 does not detect the interrupt, it does not cancel the standby state. Detection of the interrupt is for example detection of an incoming call from a communication line network, detection of user's key operation, or the like.

In the case where the standby state is not cancelled (NO in step S124), electronic device 100 repeats the process of step S124. Namely, electronic device 100 (multi-core 10) is kept in the standby state. In contrast, in the case where the standby state is cancelled (YES in step S124), electronic device 100 repeats the process from step S102.

While the foregoing description is given of the case where it is determined in step S112 whether or not the processing load of multi-core 10 is less than predetermined threshold value C. In the case, however, where electronic device 100 is configured to include bus masters other than multi-core 10, electronic device 100 may take into consideration the processing loads of all bus masters including multi-core 10. Specifically, multi-core 10 may perform a step, instead of step S112, of determining whether or not the conditions: (1) the processing load of multi-core 10 itself is less than threshold value C; and (2) the processing load of each of the other bus masters is less than threshold value Cx which is set for each bus master, are met. In the case where the conditions (1) and (2) are met, electronic device 100 proceeds to the process of step S114. In the case where the conditions (1) and (2) are not met, electronic device 100 repeats the process of step S112.

[Second Embodiment]
<Hardware Configuration>

Figure 8:
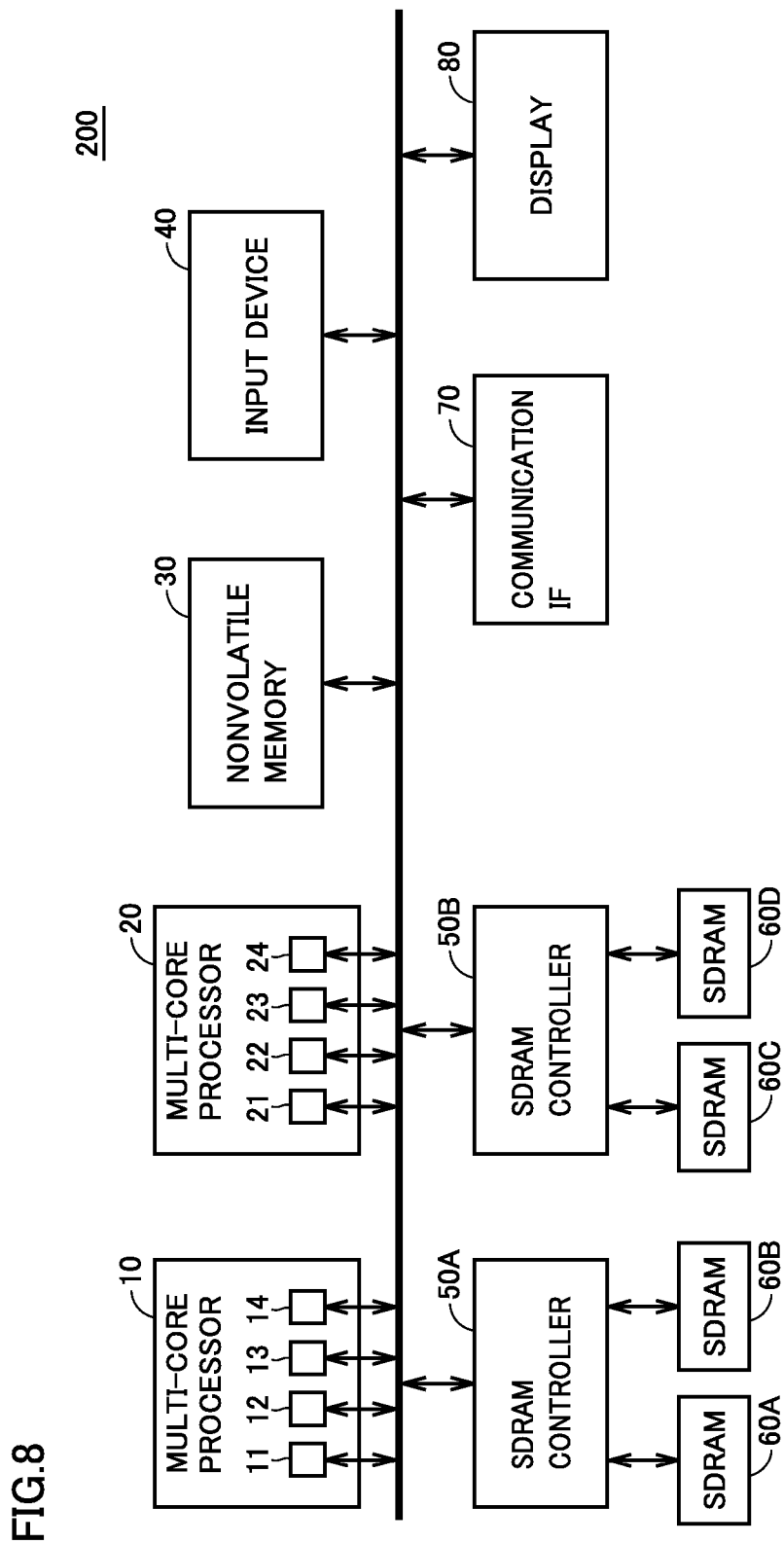
FIG. 8 is a schematic diagram showing a hardware configuration of an electronic device according to a second embodiment.

FIG. 8 is a schematic diagram showing a hardware configuration of an electronic device 200 according to a second embodiment. The hardware configuration of electronic device 200 corresponds to the hardware configuration of electronic device 100 of the first embodiment to which a multi-core 20 is added. Thus, the detailed description of those parts similar to the hardware configuration of electronic device 100 will not be repeated.

Multi-core 20 has a plurality of cores 21 to 24. Specifically, multi-core 20 is a multi-core processor equipped with four cores (cores 21 to 24) operating merely at lower-speed frequencies (having lower information processing ability) than cores 11 to 14 mounted on multi-core 10 but consuming less power than cores 11 to 14. Multi-core 10 and multi-core 20 are configured to be able to individually process information, and at least one of these cores controls each part of electronic device 200. Namely, like multi-core 10, multi-core 20 can control nonvolatile memory 30, input device 40, controller 50, SDRAM 60, communication interface 70, and display 80. In the following, it is supposed for the sake of ease of description that at least core 21 is an active core. Further, in order to control the CPU operating frequency and the number of active cores, multi-core 20 monitors the operating frequency and the utilization ratio of cores 21, 22, 23, 24 at regular intervals to manage the operating frequency and the number of active cores of multi-core 20 as a whole.

<Operating State>

Figure 9:
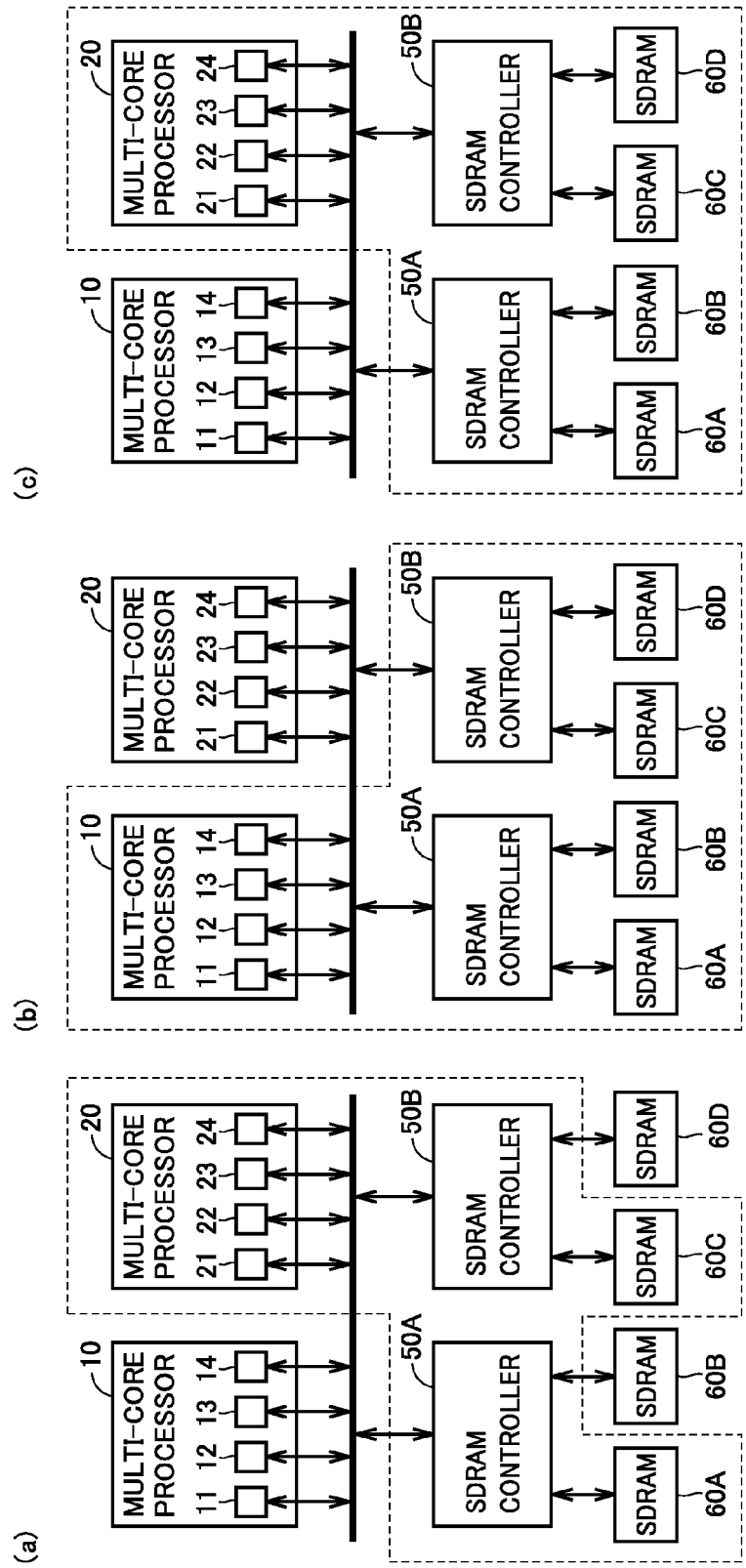
FIG. 9 is a conceptual diagram for illustrating a plurality of operating states of the electronic device according to the second embodiment.

FIG. 9 is a conceptual diagram for illustrating a plurality of operating states of electronic device 200 according to the second embodiment. It should be noted that FIG. 9 shows only multi-core 10, multi-core 20, controller 50, and SDRAM 60, for the sake of ease of description. Further, it is supposed that each SDRAM 60 has a capacity of 1 GB.

The operating state of electronic device 200 shown in FIG. 9 (a) is a state where multi-core 20 utilizes SDRAM 60A through controller 50A, utilizes SDRAM 60C through controller 50B, and also controls the operation of electronic device 200 (hereinafter also referred to "Operating State A1"). In Operating State A1, SDRAM 60B, 60D have been shifted to the DPD state, and therefore, multi-core 20 can utilize a memory capacity of 2 GB.

The operating state of electronic device 200 shown in FIG. 9 (b) is a state where multi-core 10 utilizes SDRAM 60A, 60B through controller 50A, utilizes SDRAM 60C, 60D through controller 50B, and also controls the operation of electronic device 200 (hereinafter also referred to as "Operating State B1"). In Operating State B1, no SDRAM 60 has been shifted to the DPD mode state. Thus, multi-core 10 can utilize all SDRAM 60 (a memory capacity of 4 GB).

The operating state of electronic device 200 shown in FIG. 9 (c) is a state where multi-core 20 utilizes SDRAM 60A, 60B through controller 50A, utilizes SDRAM 60C, 60D through controller 50B, and also controls the overall operation of electronic device 200 (hereinafter also referred to as "Operating State C1"). In Operating State C1, like Operating State B1, no SDRAM 60 has been shifted to the DPD state. Thus, multi-core 20 can utilize all SDRAM 60 (a memory capacity of 4 GB).

Based on the foregoing, the operating state of electronic device 200 with the smallest power consumption, among Operating States A1 to C1, is Operating State A1 in which multi-core 20 with smaller power consumption than multi-core 10 can utilize SDRAM 60 corresponding to 2 GB (the remaining 2 GB is in the DPD state). Namely, Operating State A1 is a power saving mode state of electronic device 200. In contrast, the operating state of electronic device 200 with the largest power consumption is Operating State B1 in which multi-core 10 with larger power consumption can utilize SDRAM 60 corresponding to 4 GB (no SDRAM 60 in the DPD state). It should be noted that the power consumption of electronic device 200 in Operating State C1 is smaller than the power consumption thereof in Operating State B1 and larger than the power consumption thereof in Operating State A1.

Electronic device 200 is configured to change between the aforementioned multiple operating states, depending on the processing load or the like of multi-core 10 and multi-core 20. For example, in the case where an application for which the processing load of the processor is large is used, the operating state is Operating State B1 in which the information processing ability is highest although the power consumption is large. In the case where an application for which the processing load of the processor is small is used, the operating state is Operating State A1 in which the power consumption is smallest. Operating State C1 is an operating state performing an intermediary function for a shift from Operating State B1 to Operating State A1 based on a predetermined condition.

It should be noted that Operating State A1 may be any state as long as it is a state where multi-core 20 can utilize SDRAM 60 corresponding to 2 GB, and is not limited to the example as shown in FIG. 9 (a). For example, Operating State A1 may be a state where multi-core 20 utilizes SDRAM 60A, 60B through controller 50A and controls the overall operation of electronic device 200, or a state where multi-core 20 utilizes SDRAM 60C, 60D through controller 50B and controls the overall operation of electronic device 200.

<Power Consumption Reducing Effect>

Figure 10:
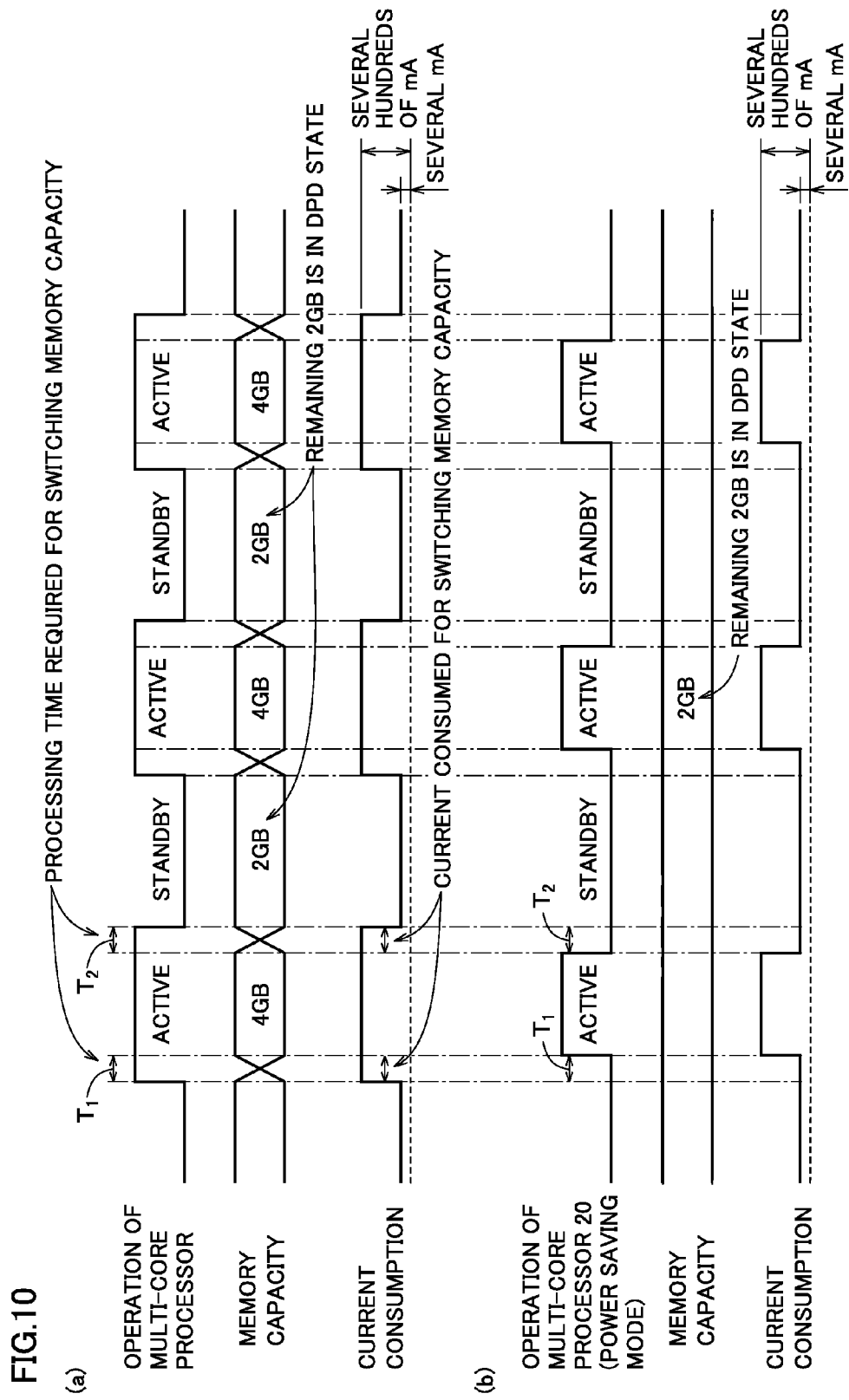
FIG. 10 is a timing diagram for illustrating a power consumption reducing effect in Operating State A1 (power saving mode) of the electronic device according to the second embodiment.

FIG. 10 is a timing diagram for illustrating a power consumption reducing effect in Operating State A1 (power saving mode) of electronic device 200 according to the second embodiment. Specifically, FIG. 10 (a) is a diagram showing changes with time of the operation of a multi-core, the memory capacity, and the power consumption of an electronic device according to a comparative example. FIG. 10 (b) is a diagram showing changes with time of the operation of multi-core 20, the memory capacity, and the power consumption of electronic device 200 according to the second embodiment. It should be noted that the performance of the multi-core of the comparative example and the performance of multi-core 20 are similar to each other. The power consumption reducing effect in Operating State A1 can basically be considered similarly to the power consumption reducing effect in Operating State A which is described above in connection with the first embodiment.

With reference to FIG. 10 (a), it is seen that the multi-core of the comparative example changes the memory capacity each time a switch is made between the standby state and the active state. Namely, the multi-core of the comparative example utilizes the memory corresponding to 4 GB when it is in the active state, and utilizes the memory corresponding to 2 GB and has shifted the memory corresponding to the remaining 2 GB to the DPD state when it is in the standby state.

In contrast, with reference to FIG. 10 (b), multi-core 20 of the second embodiment utilizes the memory corresponding to 2 GB and keeps the memory corresponding to the remaining 2 GB in the DPD state, when it is in the power saving mode (Operating State A1), regardless of whether it is in the standby state or the active state. Accordingly, multi-core 20 of the second embodiment can reduce the current consumption by an amount corresponding to a processing time of T1+T2, relative to the multi-core of the comparative example.

As described above, an electronic device such as smart phone communicates with a base station or the like every a few seconds, and therefore, the multi-core is frequently and repeatedly changed between the standby state and the active state. Thus, relative to the electronic device equipped with the multi-core of the comparative example which switches the memory capacity each time a switch is made between the standby state and the active state, electronic device 200 equipped with multi-core 20 which does not switch the memory capacity regardless of whether it is in the standby state or the active state can reduce the power consumption as a whole.

It should be noted that although the memory capacity is switched in electronic device 200 as well when a transition is made between Operating State A1 and Operating State B1, a transition from the standby state to Operating State B1 will not be made unless the user causes such a transition as intended. At least the communication with a base station does not cause the transition from the standby state to Operating State B1. Thus, the power consumption of electronic device 200 can be reduced relative to the electronic device equipped with the multi-core of the comparative example.

As described above, in the case where electronic device 200 is in Operating State A1, the available memory capacity is 2 GB even when multi-core 20 is in the active state. Operating State A1 is as an operating state under the condition that a high throughput of the processor is unnecessary, and therefore, a disadvantage caused by the fact that a memory capacity of 2 GB is maintained regardless of whether the multi-core is the active state or the standby state is insignificant, and an advantage that the power consumption can be reduced is rather significant.

<Transitions of the Operating State>

Figure 11:
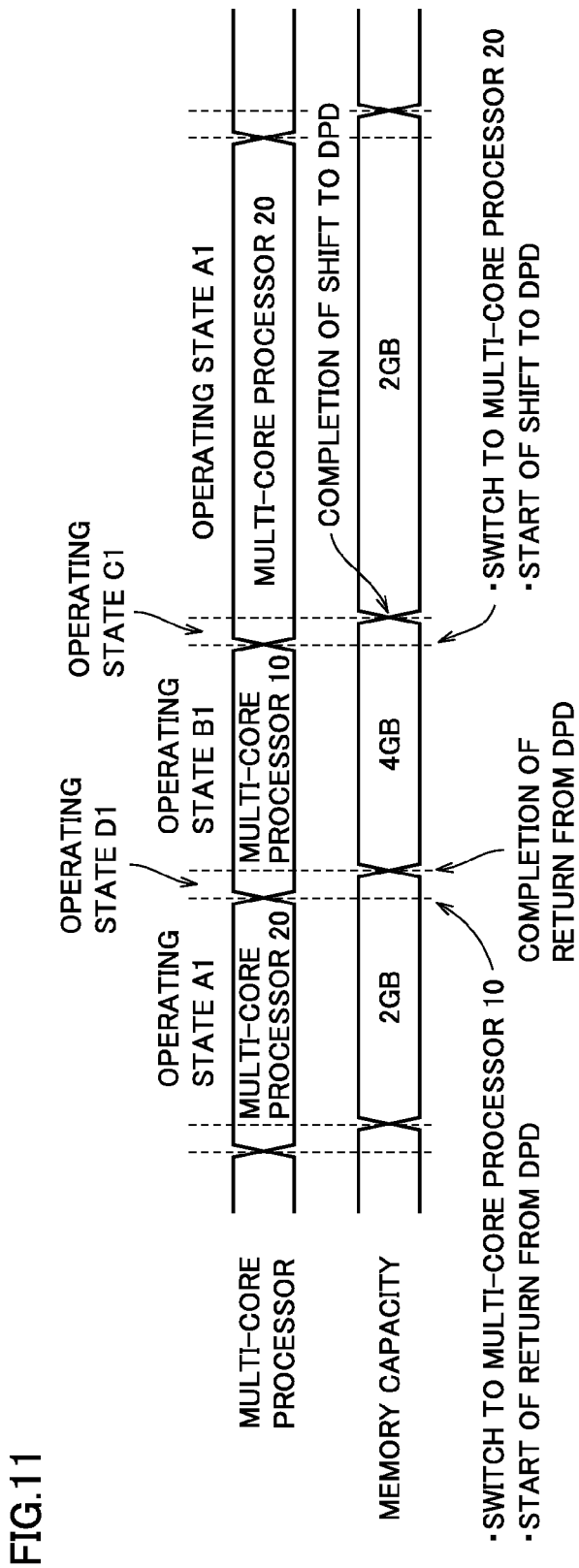
FIG. 11 is a timing diagram for illustrating transitions of the operating state of the electronic device according to the second embodiment.

FIG. 11 is a timing diagram for illustrating transitions of the operating state of electronic device 200 according to the second embodiment. Referring to FIG. 11, a description will be given of a situation where electronic device 200 makes a transition from Operating State A1 to Operating State B1. Electronic device 200 in Operating State A1 starts making a transition to Operating State B1 of high performance when the processing load of multi-core 20 becomes a predetermined threshold value A1 or more (for example, cores 21 to 24 operate at the maximum frequency and the utilization ratio of core 21 becomes 90% or more). Specifically, multi-core 20 is switched to multi-core 10 so that multi-core 10, rather than multi-core 20, performs the operation control of electronic device 200. An example of the method for switching the processor may be the task migration capability or the like used for a big.Little system or the like for making a switch between processors of different types. Specifically, multi-core 20 transmits to multi-core 10 start information for causing multi-core 10, instead of multi-core 20, to control the operation of electronic device 200, to thereby start multi-core 10. When multi-core 10 having received the start information is started, multi-core 20 completely stores the processor state in a secondary cache. Then, multi-core 10 reads the processor state to recover the state, and takes over the process which was being executed by multi-core 20. At this time, copying is done so that respective secondary cashes of multi-core 10 and multi-core 20 are identical to each other. After the identity therebetween is established, multi-core 20 clears the cache and turns off its power.

Then, multi-core 10 starts the operation control of electronic device 200 and causes SDRAM 60 corresponding to 2 GB having been shifted to the DPD state to return to a normal state. Namely, electronic device 200 makes a transition to Operating State B1 in which multi-core 10 utilizes SDRAM 60 corresponding to 4 GB and controls the operation of electronic device 200. It should be noted that during the transition from Operating State A1 to Operating State B1, Operating State D1 is temporarily generated in which multi-core 10 utilizes SDRAM 60 corresponding to 2 GB and controls the operation of electronic device 200.

Next, a description will be given of a situation where electronic device 200 makes a transition from Operating State B1 to Operating State A1. Electronic device 200 in Operating State B1 starts making a transition to Operating State A1 of low performance when the processing load of multi-core 10 becomes less than a predetermined threshold value B1 (for example, only core 11 is an active core, core 11 operates at the minimum frequency, and the utilization ratio of core 11 is less than 20%). The above-described switching method is used to switch multi-core 10 to multi-core 20 so that multi-core 20 performs the operation control of electronic device 200. Multi-core 20 starts the operation control of electronic device 200 and causes a transition from Operating State B1 to Operating State C1.

Then, when multi-core 20 satisfies a predetermined condition, multi-core 20 causes SDRAM 60 corresponding to 2 GB, out of the available SDRAM 60 corresponding to 4 GB, to shift to the DPD state. For example, when multi-core 20 determines that its processing load is less than a predetermined threshold value C1 (for example, core 21 operates at a low frequency, the utilization ratio of core 21 is less than 90%, and the number of active cores other than core 21 is one or less), multi-core 20 causes SDRAM 60 corresponding to 2 GB to shift to the DPD state based on the state of controller 50. More specifically, when multi-core 20 determines that its processing load is less than threshold value C1 and determines that controller 50 is in an idle state based on a status register of controller 50, multi-core 20 causes SDRAM 60 corresponding to 2 GB to shift to the DPD state. In this way, electronic device 200 makes a transition from Operating State C1 to Operating State A1.

Figure 12:
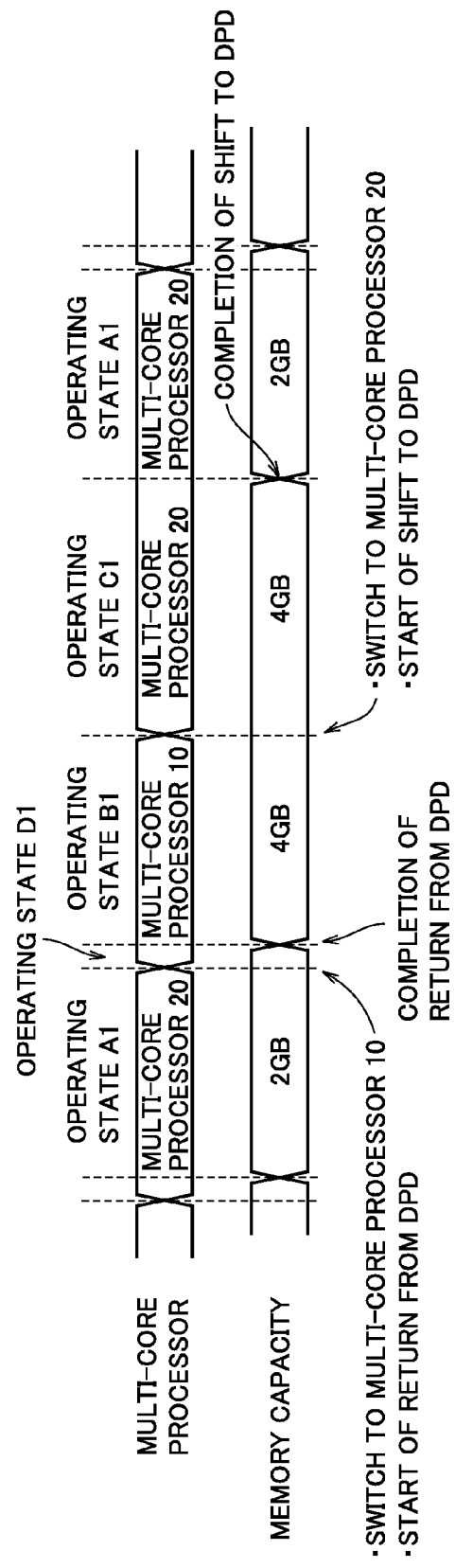
FIG. 12 is another timing diagram for illustrating transitions of the operating state of the electronic device according to the second embodiment.

Next, a description will be given of another example of the transitions of the operating state of electronic device 200 according to the second embodiment. FIG. 12 is another timing diagram for illustrating transitions of the operating state of electronic device 200 according to the second embodiment. Referring to FIG. 12, the situation where electronic device 200 makes a transition from Operating State A1 to Operating State B1 and the situation where it makes a transition from Operating State B1 to Operating State C1 are similar to those of the example in FIG. 11, and therefore, the detailed description thereof will not be repeated.

As shown in FIG. 12, in the situation where a transition is made from Operating State C1 to Operating State A1, the time from the start of the process of shifting SDRAM 60 corresponding to 2 GB to the DPD state to the completion of this process is longer than that in the timing diagram of FIG. 11. This is for the reason that multi-core 20 confirms the processing loads of all bus masters including multi-core 20 itself.

Specifically, when multi-core 20 determines that the processing loads of all bus masters including multi-core 20 itself are less than a predetermined threshold value which is optimized for each bus master, multi-core 20 causes SDRAM 60 corresponding to 2 GB to shift to the DPD state based on the state of controller 50. Specifically, multi-core 20 determines whether or not the conditions: (1) the processing load of multi-core 20 is less than threshold value C1; and (2) the processing load of each of other bus masters is less than threshold value C1x which is set for each bus master, are met. In the case where multi-core 20 determines that the conditions (1) and (2) are met and determines that controller 50 is in the idle state based on the status register of controller 50, multi-core 20 causes SDRAM 60 corresponding to 2 GB to shift to the DPD state. In this way, electronic device 200 makes a transition from Operating State C1 to Operating State A1.

<Process Procedure>

Figure 13:
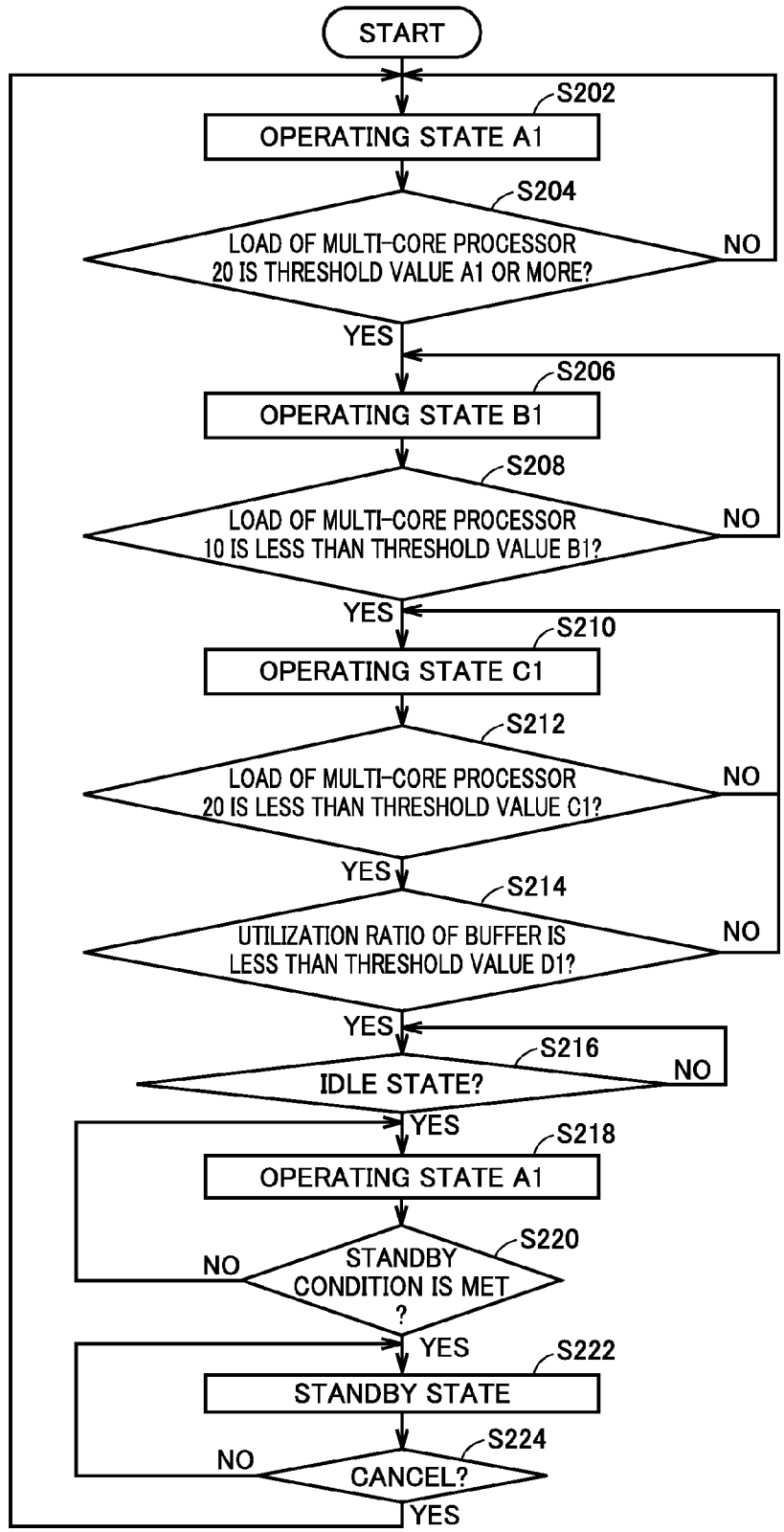
FIG. 13 is a flowchart showing a control process for the capacity of an SDRAM of the electronic device according to the second embodiment.

FIG. 13 is a flowchart showing a control process for the capacity of the SDRAM of electronic device 200 according to the second embodiment. Each of the following steps is basically implemented through execution, by multi-core 10 and multi-core 20, of a program stored in nonvolatile memory 30.

Referring to FIG. 13, electronic device 200 determines, while being kept in Operating State A1 (step S202), whether or not the processing load of multi-core 20 is predetermined threshold value A1 or more (step S204). Specifically, multi-core 20 makes this determination based on at least any of the number of active cores, the utilization ratio of cores 21 to 24, and the operating frequency thereof. For example, in the case where the utilization ratio of core 21 is 90% or more and cores 21 to 24 are operating at the maximum operable frequency, multi-core 20 determines that the processing load is threshold value A1 or more.

When the processing load of multi-core 20 is not threshold value A1 or more (NO in step S204), electronic device 200 repeats the process from step S202. In contrast, when the processing load is threshold value A1 or more (YES in step S204), electronic device 200 makes a transition from Operating State A1 to Operating State B1 (step S206). Specifically, the above-described switching method causes multi-core 20 to switch to multi-core 10 so that the operation control of electronic device 200 is done by multi-core 10. Multi-core 10 starts the operation control of electronic device 200 and causes SDRAM 60 corresponding to 2 GB having been shifted to the DPD state to return to the normal state.

Next, electronic device 200 determines whether or not the processing load of multi-core 10 is less than predetermined threshold value B1 (step S208). Specifically, multi-core 10 makes this determination based on at least any of the number of active cores, the utilization ratio of cores 11 to 14, and the operating frequency thereof. For example, in the case where only core 11 operates, the utilization ratio of core 11 is less than 20%, and the operating frequency of core 11 is the minimum operable frequency, multi-core 10 determines that the processing load is less than threshold value B1.

In the case where the processing load of multi-core 10 is not less than threshold value B1 (NO in step S208), electronic device 200 repeats the process from step S206. In contrast, when the processing load is less than threshold value B1 (YES in step S208), electronic device 200 makes a transition from Operating State B1 to Operating State C1 (step S210). Specifically, the above-described switching method causes multi-core 10 to switch to multi-core 20 so that the operation control of electronic device 200 is done by multi-core 20.

Next, electronic device 200 determines whether or not the processing load of multi-core 20 is less than predetermined threshold value C1 (step S212). Specifically, based on at least any of the number of active cores, the utilization ratio of cores 21 to 24, and the operating frequency of cores 21 to 24, multi-core 20 makes the determination. For example, multi-core 20 determines whether or not core 21 operates at the minimum frequency, the utilization ratio of core 21 is less than 90%, and the number of active cores other than core 21 is one or less.

In the case where the processing load of multi-core 20 is not less than threshold value C1 (NO in step S212), electronic device 200 repeats the process from step S210. In contrast, in the case there the processing load is less than threshold value C1 (YES in step S212), it determines whether or not the utilization of a Read/Write buffer of controller 50 is less than a predetermined threshold value D1 (step S214). Specifically, multi-core 20 monitors controller 50 and determines whether or not the state where the utilization ratio of the buffer is less than 25% continues for a prescribed time or more.

In the case where the utilization ratio of the buffer is not less than threshold value D1 (NO in step S214), electronic device 200 repeats the process from step S210. In contrast, when the utilization ratio of the buffer is less than threshold value D1 (YES in step S214), electronic device 200 proceeds to the process of step S216. The above-described processes of steps S212 and S214 are a process for multi-core 20 to find the timing at which a request for an access to SDRAM 60 does not frequently occur.

The process of steps S216 to S224 performed by multi-core 20 is basically similar to the process of steps S116 to S124 (FIG. 7) performed by multi-core 10, except that what performs the process is different. The following is therefore a brief description of the process.

Electronic device 200 (multi-core 20) confirms the status register of controller 50 and determines whether or not controller 50 is in the idle state (step S216). In the case where controller 50 is not in the idle state (NO in step S216), electronic device 200 repeats the process of step S216. It should be noted that multi-core 20 monitors the operating frequency and the utilization ratio of cores 21, 22, 23, 24 at regular intervals and manages the operating frequency and the number of active cores of multi-core 20 as a whole, as described above. Specifically, even while the processes from step S210 to step S216 are performed, multi-core 20 monitors the operating frequency and the utilization ratio of cores 21, 22, 23, 24 all the time and controls the operating frequency of cores 21, 22, 23, 24 and the number of active cores. Therefore, in the case for example where the load of multi-core 20 becomes threshold value A1 or more in the period from step S210 to the time when the result of step S216 is "YES," electronic device 200 returns again to Operating State B1 (step S206) in which the operation control is performed by multi-core 10.

In contrast, in the case where controller 50 is in the idle state (YES in step S216), electronic device 200 makes a transition from Operating State C1 to Operating State A1 (step S218). Subsequently, electronic device 200 determines whether or not a standby condition under which a shift to the standby state is made is met or not (step S220). When the standby condition is not met (NO in step S220), electronic device 200 repeats the process from step S220. In contrast, when the standby condition is met (YES in step S220), electronic device 200 makes a transition to the standby state (step S222). Subsequently, electronic device 200 determines whether to cancel the standby state or not (step S224). In the case where the standby state is not cancelled (NO in step S224), electronic device 200 repeats the process from step S224. In contrast, in the case where the standby state is cancelled (YES in step S224), electronic device 200 repeats the process from step S202.

As to the foregoing, electronic device 200 may take into consideration the processing loads of all bus masters including multi-core 20, similarly to the first embodiment. In this case, multi-core 20 may perform a step, instead of step S212, of determining whether or not the conditions: (1) the processing load of multi-core 20 is less than threshold value C1; and (2) the processing load of each of the other bus masters is less than threshold value C1x which is prepared for each bus master, are met. In the case where the conditions (1) and (2) are met, electronic device 100 proceeds to the process of step S214. In the case where the conditions (1) and (2) are not met, electronic device 100 repeats the process of step S212.

[Other Embodiments]

Regarding the present embodiments, while the above description is given of the case where respective capacities of a plurality of SDRAMs are all 1 GB, the embodiments are not limited to this. For example, respective capacities of the SDRAMs may be different from each other, and the number of SDRAMs is not limited to four as long as the number thereof is two or more.

Regarding the present embodiments, while the above description is given of the case where two SDRAMs are connected to each of the two SDRAM controllers, the embodiments are not limited to this. For example, all SDRAMs may be connected to one SDRAM controller, or one SDRAM may be connected to one SDRAM controller.

Regarding the present embodiments, while the above description is given of the case where a half of the total memory capacity is shifted to the DPD state, the embodiments are not limited to this. For example, the memory capacity corresponding to 1 GB or the memory capacity corresponding to 3 GB, out of the memory capacity corresponding to 4 GB, may be shifted to the DPD state. Namely, any memory capacity may be shifted to the DPD state as long as a predetermined number of SDRAMs out of a plurality of SDRAMs is shifted to the DPD state.

Regarding the present embodiments, while the above description is given of the case where the electronic device is equipped with the multi-core processor, the processor may be a single-core processor. In this case, the number of active cores is not taken into consideration when the determination is made based on the threshold value as described above, but the determination is made based on the utilization ratio and/or the operating frequency of the single core. It should be noted that the above-described threshold values are not limited to those of the present examples but may be determined within an appropriate range in any manner by a user or developer.

Regarding the present embodiments, while the above description is given of the case where the stopped state of the SDRAM is the DPD state, the stopped state may be a partial refresh state.

It should be noted that a program may be provided that causes a computer to operate and execute the control as described above in connection with the flowcharts. Such a program may also be provided as a program product by being recorded on a non-transitory computer-readable recording medium such as flexible disk, CD-ROM, ROM, RAM, and memory card attached to a computer. Alternatively, the program may be provided by being recorded on a recording medium such as hard disk incorporated in a computer. The program may also be provided by being downloaded through a network.

The program may be the one that calls, in a predetermined order and at a predetermined timing, necessary modules among program modules provided as a part of an operating system (OS) of a computer, and causes the modules to execute processing. In this case, the program itself does not include the modules but cooperates with the OS to cause the processing to be executed. Such a program that does not include modules may also be included in the program according to the present embodiments.

The program according to the present embodiments may be provided by being incorporated in a part of another program. In this case as well, the program itself does not include modules that are included in the aforementioned other program, but cooperates with the other program to cause processing to be executed. Such a program incorporated in the other program may also be included in the program according to the present embodiment.

<Effects of the Embodiments>

In accordance with the present embodiments, the processor to be used or the memory capacity is changed as appropriate depending on the processing load of the processor. Namely, the electronic device according to the present embodiments operates to reduce the power consumption as much as possible in the case where the processing load of the processor is small and deterioration of the performance felt by a user is small even when the throughput of the processor and the memory capacity are relatively small, and operates to make full use of the throughput of the processor and the memory capacity in the case where the processing load of the processor is large. Accordingly, the electronic device of the present embodiments can appropriately reduce the power consumption depending on the condition of use by a user.

It should be construed that embodiments disclosed herein are given by way of illustration in all respects, not by way of limitation. It is intended that the scope of the present invention is defined by claims, not by the description above, and encompasses all modifications and variations equivalent in meaning and scope to the claims.

REFERENCE SIGNS LIST 10, 20 multi-core processor; 30 nonvolatile memory; 40 input device; 50A, 50B SDRAM controller; 60A, 60B, 60C, 60D SDRAM; 70 communication interface; 80 display; 100, 200 electronic device

The invention claimed is:

1. An electronic device having a power saving mode, comprising:
   a processor controlling an operation of the electronic device;
   a plurality of memories configured to be able to become a stopped state individually, and available to the processor; and
   a memory controller controlling the plurality of memories,
   the processor causing a predetermined number of memories among the plurality of memories to become the stopped state, based on a processing load of the processor, to thereby make a shift to the power saving mode,
   wherein when the processor determines that the processing load of the processor is less than a first threshold value, the processor causes the predetermined number of memories to become the stopped state, based on a state of the memory controller, to thereby make the shift to the power saving mode,
   wherein the processor further determines, based on a status register of the memory controller, the memory controller is in an idle state representing a state where the memory controller does not access the plurality of memories, the processor causes the predetermined number of memories to become the stopped state, to thereby make the shift to the power saving mode, and
   in the power saving mode, the processor having a standby state of restricting the operation of a part of the electronic device and an active state of normally controlling the operation of the electronic device, and maintaining the stopped state of the predetermined number of memories regardless of whether the processor is in the standby state or the active state.

2. An electronic device having a power saving mode, comprising:

a first processor and a second processor whose power consumption is smaller than power consumption of the first processor, at least one of the first and second processors controlling an operation of the electronic device; and a plurality of memories configured to be able to become a stopped state individually, and available to the first and second processors, when the first processor determines that a processing load of the first processor utilizing the plurality of memories becomes less than a first threshold value, the first processor transmitting to the second processor start information for causing the second processor to control the operation of the electronic device instead of the first processor, in response to receiving the start information from the first processor, the second processor starting control of the operation of the electronic device, and causing a predetermined number of memories among the plurality of memories to become the stopped state, based on a predetermined condition, to thereby make a shift to the power saving mode, and in the power saving mode, the second processor having a standby state of restricting the operation of a part of the electronic device and an active state of normally controlling the operation of the electronic device, and maintaining the stopped state of the predetermined number of memories regardless of whether the second processor is in the standby state or the active state.

3. The electronic device according to claim 2, wherein when the second processor determines that a processing load of the second processor becomes a second threshold value or more, the second processor transmits to the first processor start information for causing the first processor to control the operation of the electronic device instead of the second processor, and in response to receiving the start information from the second processor, the first processor starts control of the operation of the electronic device, and causes the predetermined number of memories to return to a normal state from the stopped state.

* * * * *